US008908765B2

(12) United States Patent
Panusopone et al.

(10) Patent No.: US 8,908,765 B2
(45) Date of Patent: Dec. 9, 2014

(54) METHOD AND APPARATUS FOR PERFORMING MOTION ESTIMATION (75) Inventors: Krit Panusopone, San Diego, CA (US); Chanchal Chatterjee, Encinitas, CA (US); Robert O. Eifrig, San Diego, CA (US); Ajay K. Luthra, San Diego, CA (US); Limin Wang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1603 days.

(21) Appl. No.: 11/940,761

(22) Filed: Nov. 15, 2007

(65) Prior Publication Data

US 2009/0129472 A1 May 21, 2009

(51) Int. Cl.
H04N 11/04 (2006.01)
H04N 19/53 (2014.01)
H04N 19/196 (2014.01)
H04N 19/57 (2014.01)
H04N 19/567 (2014.01)
H04N 19/19 (2014.01)
H04N 19/51 (2014.01)
H04N 19/105 (2014.01)
H04N 19/533 (2014.01)
H04N 19/176 (2014.01)
H04N 19/56 (2014.01)
H04N 19/157 (2014.01)

(52) U.S. Cl.
CPC ....... *H04N 19/006* (2013.01); *H04N 19/00375* (2013.01); *H04N 19/00678* (2013.01); *H04N 19/00369* (2013.01); *H04N 19/00672* (2013.01); *H04N 19/00351* (2013.01); *H04N 19/00587* (2013.01); *H04N 19/00024* (2013.01); *H04N 19/00606* (2013.01); *H04N 19/00278* (2013.01); *H04N 19/0066* (2013.01); *H04N 19/00212* (2013.01)
USPC ................. 375/240.16; 375/240.24

(58) Field of Classification Search
None
See application file for complete search history.

(56) References Cited

U.S. PATENT DOCUMENTS 6,160,917 A * 12/2000 Sommer ................. 382/236
6,711,211 B1 3/2004 Lainema
7,804,900 B2 * 9/2010 Jou ......................... 375/240.18
7,856,059 B2 * 12/2010 Haskell et al. ........... 375/240.15

(Continued)

FOREIGN PATENT DOCUMENTS

EP        1513350 A1    3/2005
WO     02/37859 A2    5/2002

OTHER PUBLICATIONS

PCT International Search Report, Re: PCT Application # PCT/US2008/081512 Oct. 29, 2008.

(Continued)

*Primary Examiner* — Hassan Phillips
*Assistant Examiner* — Mark A Mais
(74) *Attorney, Agent, or Firm* — Stewart M. Wiener (57) ABSTRACT The present invention discloses a system and method for performing motion estimation associated with an encoder, e.g., a H.264/MPEG-4 AVC compliant encoder. For example, the method selects a motion vector centering for a current block in a search area of at least one reference picture. The method calculates a matching cost for each of a plurality of candidate motion vectors derived from the search area, and outputs at least one of the plurality of candidate motion vectors based on the matching cost associated with each of the plurality of candidate motion vectors to a main coding loop.

25 Claims, 4 Drawing Sheets (56) References Cited

U.S. PATENT DOCUMENTS

| | | | |
|---|---|---|---|
| 7,953,152 B1* | 5/2011 | Ameres et al. | 375/240.16 |
| 8,014,447 B2* | 9/2011 | Hinz et al. | 375/240.03 |
| 8,325,796 B2* | 12/2012 | Wilkins et al. | 375/240.02 |
| 8,326,075 B2* | 12/2012 | Wilkins et al. | 382/268 |
| 2005/0089098 A1* | 4/2005 | Sato et al. | 375/240.16 |
| 2005/0207494 A1 | 9/2005 | Ahm et al. | |
| 2006/0165168 A1* | 7/2006 | Boyce et al. | 375/240.12 |
| 2006/0215758 A1* | 9/2006 | Kawashima | 375/240.16 |
| 2007/0047648 A1* | 3/2007 | Tourapis et al. | 375/240.13 |

OTHER PUBLICATIONS

EPC Extended Search Report, RE: Application #08848745.9-2223/2213006, PCT/US2008081512; Feb. 1, 2011.

Ates H F, et al, "SAD Reuse in Hierarchical Motion Estimation for the H.264 Encoder", 2005 IEEE International Conference on Acoustics, Speech and Signal Processing (IEEE CAT. No. 05CH37625); Mar. 18, 2005.

Qi H, et al, "A Study on the Motion Vector Prediction Schemes for AVS", Visual Communications and Image Processing; Jul. 12, 2005.

Office Action, Korean App. No. 10-2010-7010669 (Foreign Text and English Translation), Nov. 29, 2011.

EPC Exam Report, RE: Application #08848745.9-1908; dated Nov. 26, 2013.

K. Tang, et al., "Enhanced SAD Reuse Fast Motion Estimation", SPIE, P.O. Box 10, Bellingham, WA 98227-0010, USA, vol. 6508, Jan. 29, 2007.

* cited by examiner

METHOD AND APPARATUS FOR PERFORMING MOTION ESTIMATION

BACKGROUND OF THE INVENTION

1. Field of the Invention

Embodiments of the present invention generally relate to an encoding system. More specifically, the present invention relates to a motion estimation method that is employed in a motion compensated encoder.

2. Description of the Related Art

Demands for lower bit-rates and higher video quality require efficient use of bandwidth. To achieve these goals, the Moving Picture Experts Group (MPEG) created the ISO/IEC international Standards 11172 (1991) (generally referred to as MPEG-1 format) and 13818 (1995) (generally referred to as MPEG-2 format), which are incorporated herein in their entirety by reference. Although these encoding standards were very effective, new and improved encoding standards, e.g., H.264/MPEG-4 AVC, have been developed.

H.264/MPEG-4 AVC is a new video coding standard that achieves data compression by utilizing various coding tools, such as spatial and temporal prediction, transform and quantization, entropy coding, and etc. Unlike other existing video coding standards, H.264 supports frame coding, field coding and picture adaptive frame and field coding. Although H.264 is a powerful video compression standard, use of a H.264-like video encoder can be very challenging in certain applications, e.g., in real-time applications.

SUMMARY OF THE INVENTION

In one embodiment, the present invention discloses a system and method for performing motion estimation associated with an encoder, e.g., a H.264/MPEG-4 AVC compliant encoder. For example, the method selects a motion vector centering for a current block in a search area of at least one reference picture. The method calculates a matching cost for each of a plurality of candidate motion vectors derived from the search area, and outputs at least one of the plurality of candidate motion vectors based on the matching cost associated with each of the plurality of candidate motion vectors to a main coding loop.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

It should be noted that although the present invention is described within the context of H.264/MPEG-4 AVC, the present invention is not so limited. Namely, the present motion compensated encoder can be an H.264/MPEG-4 AVC compliant encoder or an encoder that is compliant to any other compression standards that are capable of exploiting the present motion estimation scheme.

Figure 1:
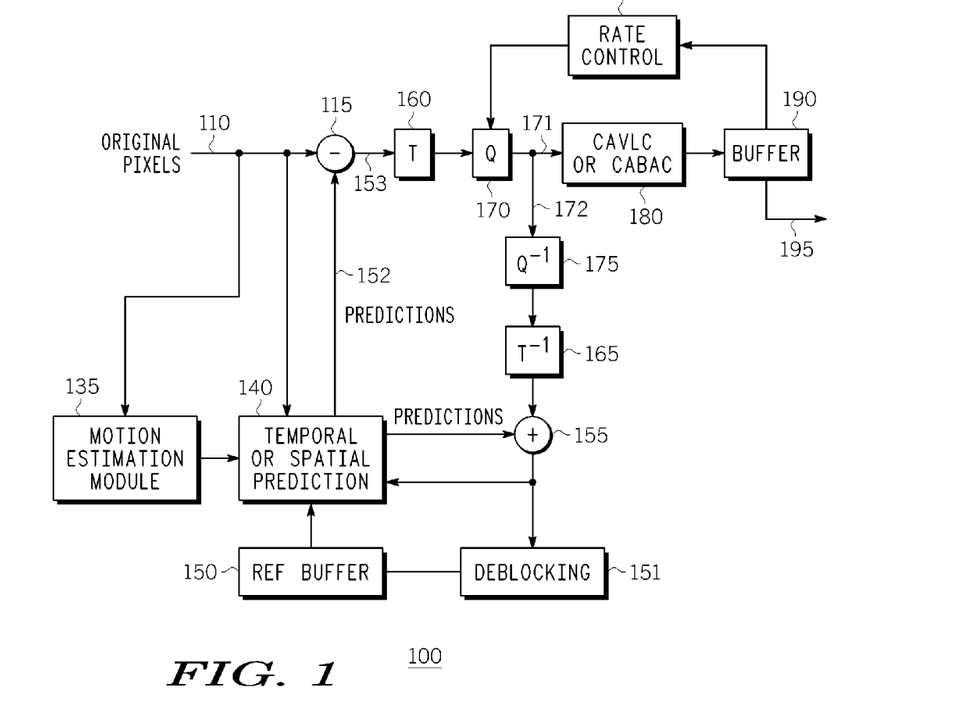
FIG. 1 illustrates an overview of an illustrative motion compensated encoder of the present invention.

FIG. 1 depicts a block diagram of an exemplary motion compensated encoder 100 of the present invention. In one embodiment of the present invention, the apparatus 100 is an encoder or a portion of a more complex motion compensation coding system. The apparatus 100 may comprise a temporal or spatial prediction module 140 (e.g., comprising a variable block motion estimation module and a motion compensation module), a rate control module 130, a transform module 160, e.g., a discrete cosine transform (DCT) based module, a quantization (Q) module 170, a context adaptive variable length coding (CAVLC) module or context-adaptive binary arithmetic coding module (CABAC) 180, a buffer (BUF) 190, an inverse quantization ($Q^{-1}$) module 175, an inverse DCT ($DCT^{-1}$) transform module 165, a subtractor 115, a summer 155, a deblocking module 151, and a reference buffer 150. Although the apparatus 100 comprises a plurality of modules, those skilled in the art will realize that the functions performed by the various modules are not required to be isolated into separate modules as shown in FIG. 1. For example, the set of modules comprising the temporal or spatial prediction module 140, inverse quantization module 175 and inverse DCT module 165 is generally known as an "embedded decoder".

FIG. 1 illustrates an input video image (image sequence) on path 110 which is digitized and represented as a luminance and two color difference signals ($Y$, $C_r$, $C_b$) in accordance with the MPEG standards. These signals can be further divided into a plurality of layers (sequence, group of pictures, picture, slice and blocks) such that each picture (frame) is represented by a plurality of blocks having different sizes. The division of a picture into block units improves the ability to discern changes between two successive pictures and improves image compression through the elimination of low amplitude transformed coefficients. The digitized signal may optionally undergo preprocessing such as format conversion for selecting an appropriate window, resolution and input format.

The input video image on path 110 is received into temporal or spatial prediction module 140 for performing spatial prediction and for estimating motion vectors for temporal prediction. In one embodiment, the temporal or spatial prediction module 140 comprises a variable block motion estimation module and a motion compensation module. The motion vectors from the variable block motion estimation module are received by the motion compensation module for improving the efficiency of the prediction of sample values. Motion compensation involves a prediction that uses motion vectors to provide offsets into the past and/or future reference frames containing previously decoded sample values that are used to form the prediction error. Namely, the temporal or spatial prediction module 140 uses the previously decoded frame and the motion vectors to construct an estimate of the current frame.

The temporal or spatial prediction module 140 may also perform spatial prediction processing, e.g., directional spatial prediction (DSP). Directional spatial prediction can be implemented for intra coding, for extrapolating the edges of the previously-decoded parts of the current picture and applying it in regions of pictures that are intra coded. This improves the quality of the prediction signal, and also allows prediction from neighboring areas that were not coded using intra coding.

Furthermore, prior to performing motion compensation prediction for a given block, a coding mode must be selected. In the area of coding mode decision, MPEG provides a plurality of different coding modes. Generally, these coding modes are grouped into two broad classifications, inter mode coding and intra mode coding. Intra mode coding involves the coding of a block or picture that uses information only from that block or picture. Conversely, inter mode coding involves the coding of a block or picture that uses information both from itself and from blocks and pictures occurring at different times.

Once a coding mode is selected, temporal or spatial prediction module 140 generates a motion compensated prediction (predicted image) on path 152 of the contents of the block based on past and/or future reference pictures. This motion compensated prediction on path 152 is subtracted via subtractor 115 from the video image on path 110 in the current block to form an error signal or predictive residual signal on path 153. The formation of the predictive residual signal effectively removes redundant information in the input video image. Namely, instead of transmitting the actual video image via a transmission channel, only the information necessary to generate the predictions of the video image and the errors of these predictions are transmitted, thereby significantly reducing the amount of data needed to be transmitted. To further reduce the bit rate, predictive residual signal on path 153 is passed to the transform module 160 for encoding.

The transform module 160 then applies a transform, e.g., a DCT-based transform. Although the transform in H.264/MPEG-4 AVC is still DCT-based, there are some fundamental differences as compared to other existing video coding standards. First, transform is an integer transform, that is, all operations are carried out with integer arithmetic. Second, the inverse transform is fully specified. Hence, there is no mismatch between the encoder and the decoder. Third, transform is multiplication free, requiring only the addition and shift operations. Fourth, a scaling multiplication that is part of the complete transform is integrated into the quantizer, reducing the total number of multiplications.

Specifically, in H.264/MPEG-4 AVC the transformation is applied to 4×4 blocks, where a separable integer transform is applied. An additional 2×2 transform is applied to the four DC coefficients of each chroma component.

The resulting transformed coefficients are received by quantization module 170 where the transform coefficients are quantized. H.264/MPEG-4 AVC uses scalar quantization. One of 52 quantizers or quantization parameters (QP)s is selected for each macroblock.

The resulting quantized transformed coefficients are then decoded in inverse quantization module 175 and inverse DCT module 165 to recover the reference frame(s) or picture(s) that will be stored in reference buffer 150. In H.264/MPEG-4 AVC an in-loop deblocking filter 151 is also employed to minimize blockiness.

The resulting quantized transformed coefficients from the quantization module 170 are also received by context-adaptive variable length coding module (CAVLC) module or context-adaptive binary arithmetic coding module (CABAC) 180 via signal connection 171, where the two-dimensional block of quantized coefficients is scanned using a particular scanning mode, e.g., a "zig-zag" order, to convert it into a one-dimensional string of quantized transformed coefficients. In CAVLC, VLC tables for various syntax elements are switched, depending on already-transmitted syntax elements. Since the VLC tables are designed to match the corresponding conditioned statistics, the entropy coding performance is improved in comparison to methods that just use one VLC table.

Alternatively, CABAC can be employed. CABAC achieves good compression by a) selecting probability models for each syntax element according to the element's context, b) adapting probability estimates based on local statistics and c) using arithmetic coding.

The data stream is received into a "First In-First Out" (FIFO) buffer 190. A consequence of using different picture types and variable length coding is that the overall bit rate into the FIFO is variable. Namely, the number of bits used to code each frame can be different. In applications that involve a fixed-rate channel, a FIFO buffer is used to match the encoder output to the channel for smoothing the bit rate. Thus, the output signal of FIFO buffer 190 is a compressed representation of the input video image 110, where it is sent to a storage medium or telecommunication channel on path 195.

The rate control module 130 serves to monitor and adjust the bit rate of the data stream entering the FIFO buffer 190 for preventing overflow and underflow on the decoder side (within a receiver or target storage device, not shown) after transmission of the data stream. A fixed-rate channel is assumed to put bits at a constant rate into an input buffer within the decoder. At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. On the other hand, if there are too many bits in the input buffer, i.e., the capacity of the input buffer is exceeded between picture starts, then the input buffer overflows resulting in an overflow error. Thus, it is the task of the rate control module 130 to monitor the status of buffer 190 to control the number of bits generated by the encoder, thereby preventing the overflow and underflow conditions. Rate control algorithms play an important role in affecting image quality and compression efficiency.

The above described encoder can be referred to as encompassing the main coding loop. In other words, the various modules in the main coding loop collectively will be able to encode input pixels into encoded bits. It should be noted that numerous variations of the main coding loop can be adapted to the present invention and the present invention is limited to a particular implementation of the main coding loop.

In one embodiment, the present invention discloses a preprocessing module 135, e.g., a full-pel motion estimation (FPME) module 135. It should be noted that the motion estimation process requires a substantial amount of computational cycles in an encoder due to its complexity. As such, for certain applications, e.g., real time applications, the motion estimation process may become a bottleneck.

In one embodiment, the present invention optimizes the motion estimation process by dividing the motion estimation process into two parts, e.g., full-pel motion estimation and refinement motion estimation. For example, in a first part, a full-pel motion estimation process in the preprocessing module 135 is implemented in a preprocessing module that operates independent of the main coding loop. In other words, the full-pel motion estimation process is performed without receiving inputs from the main coding loop pertaining to a current picture that is being encoded. In one embodiment, the full-pel motion estimation process determines one or more candidate motion vectors for each current block of a picture from a priori information, e.g., from the original video sequence at half horizontal resolution without any feedback from the main coding loop. For example, the actual coding information pertaining to neighboring blocks relative to a current block of a current picture that is being encoded is not received by the full-pel motion estimation process. However, as discussed below, the full-pel motion estimation process may use coding information of previously encoded pictures.

In a second part, the temporal or spatial prediction module 140 of the main coding loop employs a refinement motion estimation process. For example, the one or more candidate motion vectors for each current block (e.g., a current macroblock) received from the full-pel motion estimation process are used to select a final motion vector for the current block. In other words, the refinement motion estimation process refines the best candidate motion vector(s) from the full-pel motion estimation process, e.g., using reconstructed video output at full resolution to minimize drift. It should be noted that any type of refinement motion estimation process can be employed. One aspect of the present invention is that the external full-pel motion estimation process operating outside of the main coding loop is able to quickly provide one or more candidate motion vectors for a current block to be coded. Using the one or more candidate motion vectors, the refinement motion estimation process can expend computational cycles to better determine a final motion vector for the current block, i.e., the one or more candidate motion vectors are used as the starting points by the refinement motion estimation process.

In operation, an encoder encodes a motion vector for a current block by computing DMV cost which relates to a difference between the motion vector and a predicted motion vector (PMV). Since the difference between the motion vector and the PMV is often smaller in magnitude than the motion vector itself, it is this difference that is encoded and transmitted to improve coding efficiency. This difference is referred to as a difference motion vector (DMV).

To select a motion vector, an encoder may use a block matching technique in the motion estimation process. For example, a block matching process may compare a candidate block with a current block and compute a matching cost based on a cost metric. It should be noted that the cost metric is non-normative in view of the H.264 standard, which means that an H.264 like encoder is allowed to adjust the cost metric in any manner. For example, a H.264 like encoder may utilize a Lagrangian based cost metric accounting for both matching quality and estimated bit cost as follows:

$$J = SAD + \lambda \|MV - PMV\| \quad \text{EQU. 1}$$

where J is the cost metric, SAD is a sum of absolute difference between a current block and a predicted block, $\lambda$ is a constant, e.g., a Lagrangian multiplier, $\|\cdot\|$ is a norm function, MV is a motion vector and PMV is a predicted motion vector. It should be noted that DMV=MV−PMV.

In one embodiment, the cost metric J of equation 1 is modified as follows:

$$J_{FPME} = 2 * SAD_{HHR} + \lambda'(\text{selen}(MV_x' - PMV_x') - \text{selen}(MV_y' - PMV_y')) \quad \text{EQU. 2}$$

where $J_{FPME}$ is the cost metric for full-pel motion estimation, e.g., as employed by motion estimation module 135, $SAD_{HHR}$ is a sum of absolute difference between a current block and a predicted block at HHR level, $\lambda'$ is a constant, e.g., a Lagrangian multiplier, where selen, a DMV cost calculation function, is a function that outputs the length of a motion vector component in bits as represented in the encoded H.264 bitstream, $MV'_x$ and $MV'_y$ are horizontal and vertical component, respectively, of a motion vector candidate and $PMV'_x$ and $PMV'_y$ are horizontal and vertical component, respectively, of an estimate predicted motion vector. It should be noted that HHR stands for half horizontal resolution, e.g., for each block, only half of the horizontal pixels are used. As such, the $SAD_{HHR}$ is multiplied by a constant of 2. Furthermore, selen(MV'−PMV') represents an estimated number of bits based on the magnitude of the difference between a MV candidate and a PMV estimate. In one embodiment, the cost metric J of equation 2 is employed by the motion estimation module 135. Since the parameters such as $\lambda'$, and PMV' are all estimates and not actual parameters deduced from the main coding loop, the cost metric J of equation 2 can be computed for a candidate motion vector, MV'. As such, given a search area, the motion estimation module 135 can quickly apply any block matching technique and compute one or more candidate motion vectors by using equation 2 by minimizing J over all candidate motion vectors, MV'.

In one embodiment, the FPME of the present invention may employ a plurality of different methods of MV centering. Search area sets working boundary for motion estimation and is defined by a size and a center position for a reference picture. In one embodiment, the FPME employs the same search area configuration (e.g., same center position) for all partition types (i.e., 16×16, two 16×8, two 8×16, four 8×8 inside one MB) so that search operations, e.g., cost calculations, can be performed simultaneously for all partition type. Alternatively, the FPME may employ different search area configurations for different partition types. MV centering will affect the FPME performance. Namely, a poor MV centering approach will need to be compensated by using a larger search area to maintain the same search quality.

Figure 2:
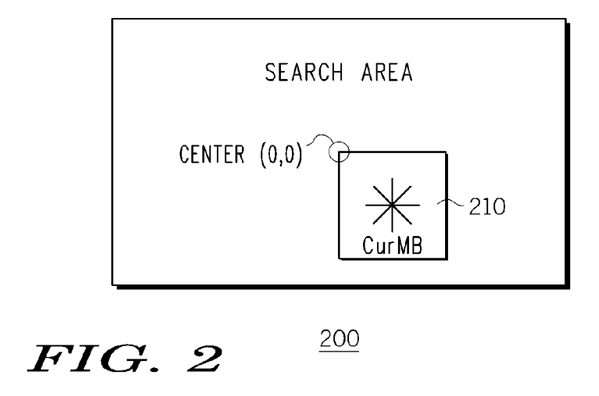
FIG. 2 illustrates an illustrative search area.

In one embodiment, the MV centering method for the FPME collocates the center of the search area in the reference picture with a top left position of the current macroblock (MB) in the current picture as shown in FIG. 2. Specifically, FIG. 2 illustrates a search area 200 where the center of the search area is shown to be collocated with the top left position of the current macroblock 210.

Figure 3:
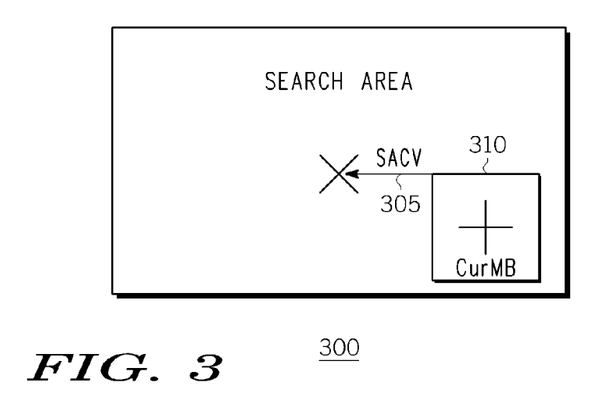
FIG. 3 illustrates another illustrative search area.
Figure 4:
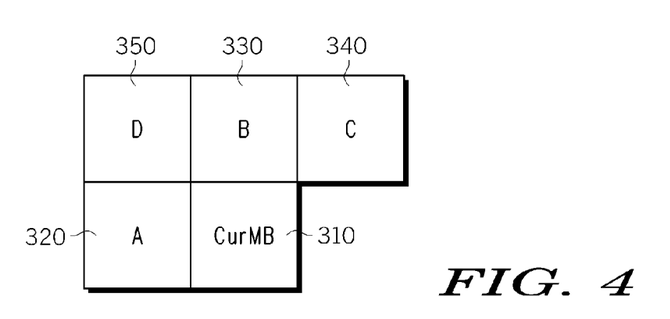
FIG. 4 illustrates one illustrative embodiment of the location of neighboring blocks relative to a current block.

In an alternative embodiment, the MV centering method for the FPME collocates the center in the reference picture of the search area at a distance SACV (Search Area Center Vector) displaced from a top left position of the current macroblock in the current picture (MB) as shown in FIG. 3. Specifically, FIG. 3 illustrates a search area 300 where the center of the search area is shown to be displaced from a top left position of the current macroblock (MB) 310. In one embodiment, the SACV 305 is a vector that is computed as a median of motion vectors (e.g., the middle value in the lowest to highest amplitude ranking of 16×16 MVs) from neighboring blocks of the current block 310. For example, FIG. 4 illustrates the current block 310 having a left neighboring block A 320, a top neighboring block B 330, a top right neighboring block C 340 and a top left neighboring block D 350. In one embodiment, the SACV is determined as a median of the 16×16 MVs from the neighboring blocks A, B and C. In one alternate embodiment, the neighboring block D can replace neighboring C if the neighboring block C is not available. It should be noted that to make FPME independent of the main coding loop, the MVs of the neighboring macroblocks are the MVs that are determined by the FPME and not the final MVs that are generated by the refinement motion estimation process from the main coding loop.

Figure 5:
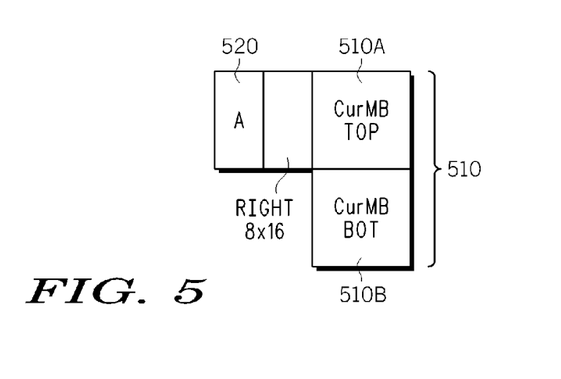
FIG. 5 illustrates another illustrative embodiment of the location of neighboring blocks relative to a current block pair.

In an alternative embodiment, the MV centering method for the FPME collocates the center of the search area in the reference picture at a distance of a common vector displaced from the center of a current macroblock pair 510 having a top MB 510a and a bottom MB 510b in the current picture. In other words, the SACV (Search Area Center Vector) is displaced from a center position of a current macroblock (MB) pair 510 in the current picture as shown in FIG. 5. In one embodiment, the SACV is a vector that is computed from a common vector that refers to a right 8×16 MV from a neighboring block A 520 of the top MB 510a of the current MB pair 510 in the current picture. Again, it should be noted that to make FPME independent of the main coding loop, the MVs of the neighboring macroblocks are the MVs that are determined by the FPME and not the final MVs that are generated by the refinement motion estimation process from the main coding loop.

As discussed above, the difference motion vector (DMV) cost calculation is performed based on a difference between a final MV for a current block and a PMV. The DMV is required because a H.264 like encoder encodes the MV for a current block by encoding the difference of the MV with respect to the PMV in bits. Unfortunately, since calculation of the DMV requires the knowledge of the true MV (the final MV encoded in the bitstream), the motion estimation process must then wait for the encoder to finish mode decision of all the neighboring blocks. This approach creates a substantial amount of delay and may not be practical for some applications, e.g., real-time applications.

In one embodiment, the present invention employs the FPME in module 135 that is external to the main coding loop. The FPME does not have any information about the true MVs of the neighboring blocks. In other words, the FPME employs an approximated PMV'. As such, the DMV cost calculation performed by the FPME is only an estimate of the number of bits associated with encoding a MV for a current block. Therefore, improving the accuracy of the estimates of the DMV cost calculation will also translate into an improvement of the processing speed and encoding efficiency of the encoder.

In one embodiment, the PMV' can be approximated or set in a number of different ways. Broadly, the PMV' is set for DMV cost calculation in three different methods, as follows:
1) Left neighbor (PMVL)—PMVs used in DMV cost calculation come from the left neighbor (e.g., macroblock A in FIG. 4) of the current macroblock.
2) Top neighbor (PMVT)—PMVs used in DMV cost calculation come from the top neighbor (e.g., macroblock B in FIG. 4) of the current macroblock.
3) Three neighbors (PMV3)—PMVs used in DMV cost calculation is the median of the MVs from the left neighbor (e.g., macroblock A in FIG. 4), the top neighbor (e.g., macroblock B in FIG. 4) and the top right neighbor (e.g., macroblock c in FIG. 4) or the top left neighbor (e.g., macroblock D in FIG. 4) of the current macroblock. As such, macroblock D can be used if macroblock C is not available.

In one embodiment, the PMVs used in the DMV cost calculation are derived from 8×8 MVs of the neighboring blocks. The present invention allows the current block to be of any partition. Various types of partitions are illustrated in FIGS. 6-9.

Figure 6:
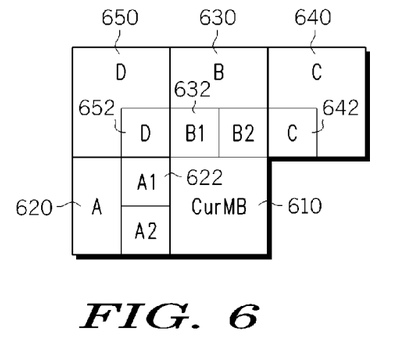
FIG. 6 illustrates one illustrative embodiment of the location of predicted motion vectors used in a difference motion vector calculation.

FIG. 6 illustrates one illustrative embodiment of the location of predicted motion vectors used in a difference motion vector calculation for a 16×16 partition of a current block 610. Under the PMVL approach, the PMV' will be derived from the MV of subblock A1 622 of neighboring block A 620. Under the PMVT approach, the PMV' will be derived from the MV of subblock B1 632 of neighboring block B 630. Under the PMV3 approach, the PMV' will be derived from the median of three MVs: the MV of subblock A1 622 of neighboring block A 620, the MV of subblock B1 632 of neighboring block B 630, and the MV of subblock C 642 of neighboring block C 640 (or the MV of subblock D 652 of neighboring block D 650 if neighboring block C 640 is not available).

Figure 7:
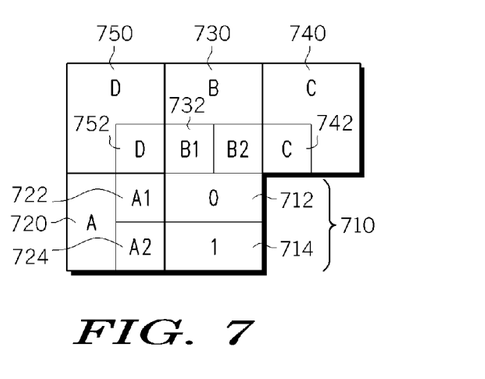
FIG. 7 illustrates another illustrative embodiment of the location of predicted motion vectors used in a difference motion vector calculation.

FIG. 7 illustrates one illustrative embodiment of the location of predicted motion vectors used in a difference motion vector calculation for a 16×8 partition of a current block 710 having a top block 712 and a bottom block 714. Under the PMVL approach for the top block 712, the PMV' will be derived from the MV of subblock A1 722 of neighboring block A 720. Under the PMVL approach for the bottom block 714, the PMV' will be derived from the MV of subblock A2 724 of neighboring block A 720.

Under the PMVT approach for the top block 712, the PMV' will be derived from the MV of subblock B1 732 of neighboring block B 730. Under the PMVT approach for the bottom block 714, the PMV' will be derived from the MV of subblock B1 732 of neighboring block B 730.

Under the PMV3 approach for the top block 712, the PMV' will be derived from the median of three MVs: the MV of subblock A1 722 of neighboring block A 720, the MV of subblock B1 732 of neighboring block B 730, and the MV of subblock C 742 of neighboring block C 740 (or the MV of subblock D 752 of neighboring block D 750 if neighboring block C 740 is not available). Under the PMV3 approach for the bottom block 714, the PMV' will be derived from the median of three MVs: the MV of subblock A1 722 of neighboring block A 720, the MV of subblock A2 724 of neighboring block A 720, and the MV of subblock B1 732 of neighboring block B 730.

Figure 8:
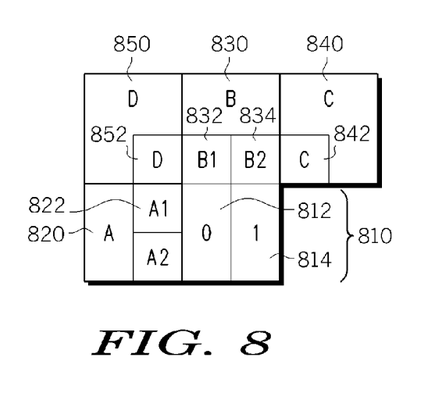
FIG. 8 illustrates another illustrative embodiment of the location of predicted motion vectors used in a difference motion vector calculation.

FIG. 8 illustrates one illustrative embodiment of the location of predicted motion vectors used in a difference motion vector calculation for a 8×16 partition of a current block 810 having a left block 812 and a right block 814. Under the PMVL approach for the left block 812, the PMV' will be derived from the MV of subblock A1 822 of neighboring block A 820. Under the PMVL approach for the right block 814, the PMV' will be derived from the MV of subblock A1 822 of neighboring block A 820.

Under the PMVT approach for the left block 812, the PMV' will be derived from the MV of subblock B1 832 of neighboring block B 830. Under the PMVT approach for the right block 814, the PMV' will be derived from the MV of subblock B2 834 of neighboring block B 830.

Under the PMV3 approach for the left block 812, the PMV' will be derived from the median of three MVs: the MV of subblock A1 822 of neighboring block A 820, the MV of subblock B1 832 of neighboring block B 830, and the MV of subblock C 842 of neighboring block C 840 (or the MV of subblock D 852 of neighboring block D 850 if neighboring block C 840 is not available). Under the PMV3 approach for the right block 814, the PMV' will be derived from the median of three MVs: the MV of subblock B1 832 of neighboring block B 830, the MV of subblock B2 834 of neighboring block B 830, and the MV of subblock C 842 of neighboring block C 840.

Figure 9:
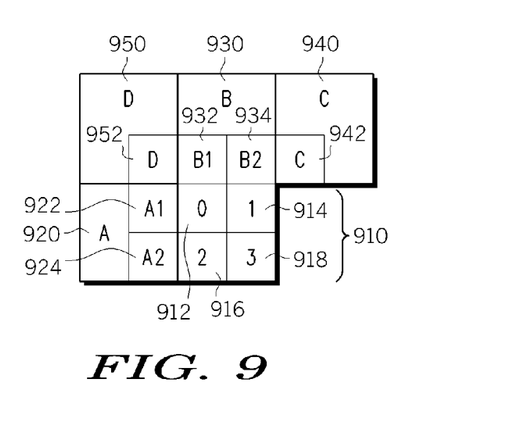
FIG. 9 illustrates another illustrative embodiment of the location of predicted motion vectors used in a difference motion vector calculation.

FIG. 9 illustrates one illustrative embodiment of the location of predicted motion vectors used in a difference motion vector calculation for a 8×8 partition of a current block 910 having a top left block 912, a top right block 914, a bottom left block 916 and a bottom right block 918. Under the PMVL approach for the top left block 912, the PMV' will be derived from the MV of subblock A1 922 of neighboring block A 920. Under the PMVL approach for the top right block 914, the PMV' will be derived from the MV of subblock A1 922 of neighboring block A 920. Under the PMVL approach for the bottom left block 916, the PMV' will be derived from the MV of subblock A2 924 of neighboring block A 920. Under the PMVL approach for the bottom right block 918, the PMV' will be derived from the MV of subblock A2 924 of neighboring block A 920.

Under the PMVT approach for the top left block 912, the PMV' will be derived from the MV of subblock B1 932 of neighboring block B 930. Under the PMVT approach for the top right block 914, the PMV' will be derived from the MV of subblock B2 934 of neighboring block B 930. Under the PMVT approach for the bottom left block 916, the PMV' will be derived from the MV of subblock B1 932 of neighboring block B 930. Under the PMVT approach for the bottom right block 914, the PMV' will be derived from the MV of subblock B2 934 of neighboring block B 930.

Under the PMV3 approach for the top left block 912, the PMV' will be derived from the median of three MVs: the MV of subblock A1 922 of neighboring block A 920, the MV of subblock B1 932 of neighboring block B 930, and the MV of subblock C 942 of neighboring block C 940 (or the MV of subblock D 952 of neighboring block D 950 if neighboring block C 940 is not available). Under the PMV3 approach for the top right block 914, the PMV' will be derived from the median of three MVs: the MV of subblock B1 932 of neighboring block B 930, the MV of subblock B2 934 of neighboring block B 930, and the MV of subblock C 942 of neighboring block C 940. Under the PMV3 approach for the bottom left block 916, the PMV' will be derived from the median of three MVs: the MV of subblock A1 922 of neighboring block A 920, the MV of subblock A2 924 of neighboring block A 920, and the MV of subblock B1 932 of neighboring block B 930. Under the PMV3 approach for the bottom right block 918, the PMV' will be derived from the median of three MVs: the MV of subblock A1 922 of neighboring block A 920, the MV of subblock A2 924 of neighboring block A 920, and the MV of subblock C 942 of neighboring block C 940.

It should be noted that for any of the methods discussed above, if any of the blocks A, B, C, or D do not exist, then the method may set the MV of that non-existing neighbor to be zero. It should be noted that all information required in the PMV' approximation is derived from local information in the FPME process without receiving any information from the main coding loop.

As discussed above, lambda λ is a Lagrangian multiplier in the cost metric. lambda λ can be defined as follows:

$$\lambda' = \sqrt{0.68 \times \frac{(QP'-12)}{6} \times 2^{\frac{(QP'-12)}{3}}} \quad \text{EQU. 3}$$

where QP' is an estimated quantization parameter.

It should be noted that in a fixed bit rate coding application, the quantization parameter (QP) information is not available to the FPME process since QP is determined in a rate control process which is part of the main coding loop. As such, the present invention uses an approximate QP' value in its cost metric.

In one embodiment, the present invention relies on the past QP information to approximate the current QP. For example, an average value of QPs from all MBs in the most recently coded picture of the same type can be made more accurate by either increasing the update frequency (e.g., every MB, every slice, etc.) or increasing the amount of information used in the QP approximation. In one embodiment, the QP approximation may use weight average values of QPs from N pictures which are M pictures away in coding order. FPME process assigns a larger weight to an average value of QP from the picture that is closer in temporal distance to the coding picture.

Figure 10:
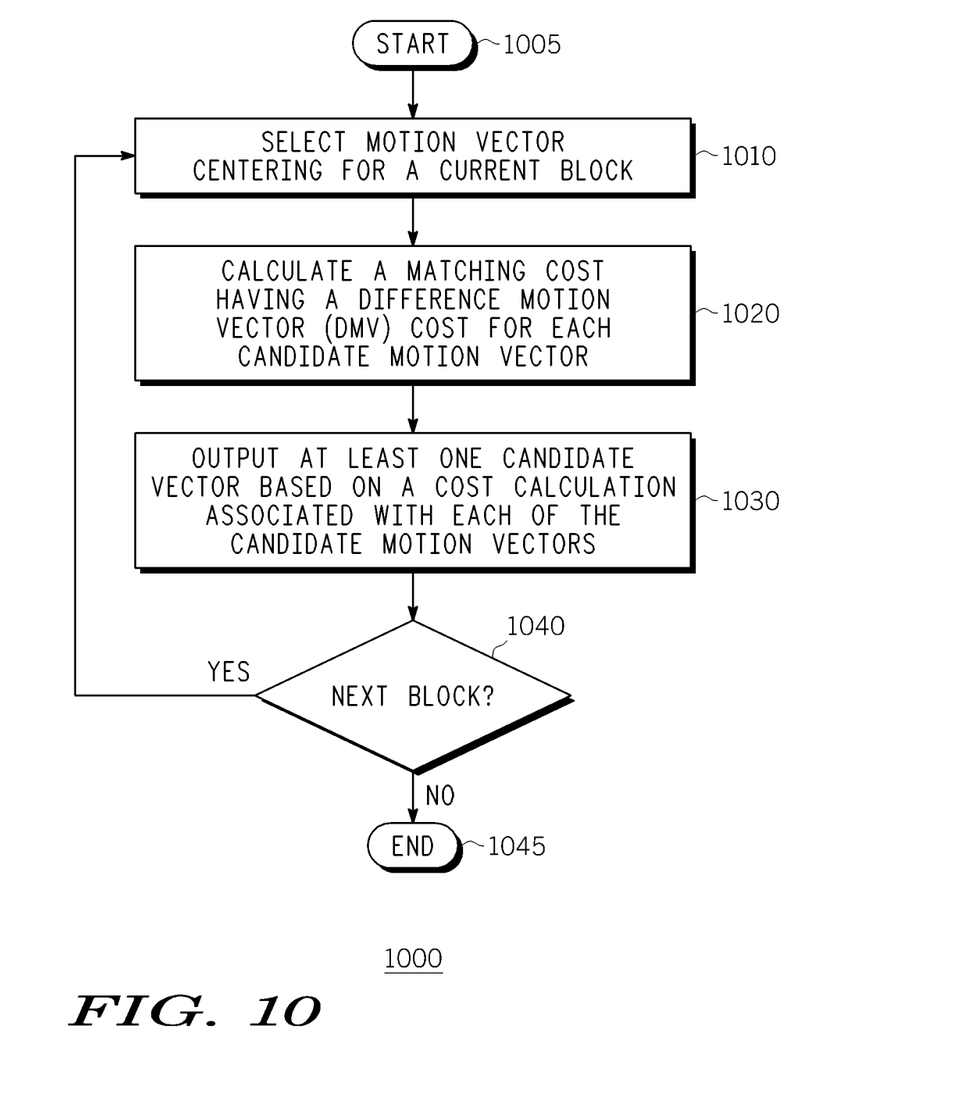
FIG. 10 illustrates a method for performing motion estimation in one embodiment of the present invention.

FIG. 10 illustrates a method 1000 for performing motion estimation in one embodiment of the present invention. For example, method 1000 can be performed by the motion estimation module 135.

Method 1000 starts in step 1005 and proceeds to step 1010. In step 1010, method 1000 selects a search area and a motion vector centering for a current block. For example, one of the three motion vector centering methods as discussed above can be employed.

In step 1020, method 1000 performs block matching for a current block in the search area and calculates a matching cost (e.g., a cost metric) for each candidate motion vector. For example, as discussed above, Equation 2 can be used in this step.

In step 1030, method 1000 outputs at least one candidate vector based on the computed matching cost for each candidate motion vector. For example, a candidate motion vector associated with a matched block in the search area having a lowest matching cost can be output by method 1000. For example, the FPME can forward the candidate motion vector to the main coding loop's temporal or spatial prediction module 140. It should be noted that the present invention is not limited to providing only a single candidate motion vector for each current block. Depending on the implementation, one or more candidate motion vectors can be provided, e.g., the two candidate motion vectors with the lowest matching cost and so on.

In step 1040, method 1000 queries whether there is a next current block to be encoded. If the query is positively answered, method 1000 returns to step 1010 and repeats the process again for the next current block. If the query is negatively answered, method 1000 ends in step 1045.

It should be noted that although not specifically specified, one or more steps of method 1000 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 10 that recite a determining operation or involve a decision, do not necessarily require that both branches of the determining operation be practiced. In other words, one of the branches of the determining operation can be deemed as an optional step.

Figure 11:
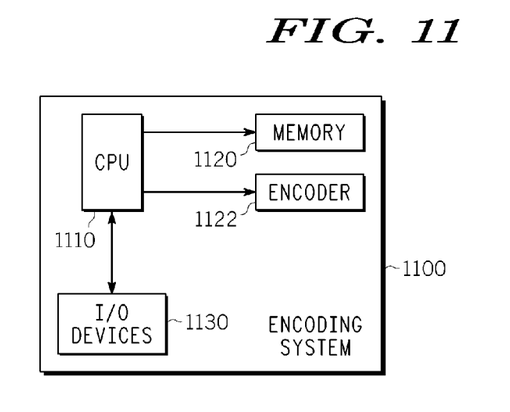
FIG. 11 illustrates the present invention implemented using a general purpose computer.

FIG. 11 is a block diagram of the present encoding system being implemented with a general purpose computer. In one embodiment, the encoding system 1100 is implemented using a general purpose computer or any other hardware equivalents. More specifically, the encoding system 1100 comprises a processor (CPU) 1110, a memory 1120, e.g., random access memory (RAM) and/or read only memory (ROM), an encoder 1122 employing the present method of an external FPME, and various input/output devices 1130 (e.g., storage devices, including but not limited to, a tape drive, a floppy drive, a hard disk drive or a compact disk drive, a receiver, a transmitter, a speaker, a display, an output port, a user input device (such as a keyboard, a keypad, a mouse, and the like), or a microphone for capturing speech commands).

It should be understood that the encoder 1122 can be implemented as physical devices or subsystems that are coupled to the CPU 1110 through a communication channel. Alternatively, the encoder 1122 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 1120 of the computer. As such, the encoder 1122 (including associated data structures and methods employed within the encoder) of the present invention can be stored on a computer readable medium or carrier, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method for performing motion estimation, comprising:
    selecting, by a motion estimation module, a motion vector centering for a current block in a search area of at least one reference picture, wherein selecting the motion vector centering comprises collocating a center of said search area at a distance displaced from a top left position of said current block, where said distance is derived from a Search Area Center Vector (SACV);
    calculating, by the motion estimation module, a matching cost for each of a plurality of candidate motion vectors derived from said search area, wherein said calculating said matching cost comprises estimating a Lagrangian multiplier, and further, wherein said Lagrangian multiplier is estimated using quantization parameter information from a plurality of macroblocks of at least one previously coded picture; and
    outputting, by the motion estimation module, at least one of said plurality of candidate motion vectors based on said matching cost associated with each of said plurality of candidate motion vectors to a main coding loop of an encoder;
    wherein the motion estimation module performs the selecting step, the calculating step, and the outputting step independently of motion vectors calculated by the main coding loop, and without receiving motion vector information from the main coding loop.

2. The method of claim 1, wherein said selecting a motion vector centering comprises collocating a center of said search area with a top left position of said current block.

3. The method of claim 1, wherein said SACV is a vector that is computed as a median of motion vectors from a plurality of neighboring blocks of said current block.

4. The method of claim 1, wherein said current block is a current block pair having a top block and a bottom block, and wherein said SACV is a vector that is computed from a common vector that refers to a motion vector from a neighboring block of said top block of said current block pair.

5. The method of claim 1, wherein said calculating said matching cost comprises estimating a predicted motion vector (PMV').

6. The method of claim 5, wherein said estimating said predicted motion vector (PMV') comprises using a motion vector selected from a left neighbor block of said current block.

7. The method of claim 5, wherein said estimating said predicted motion vector (PMV') comprises using a motion vector selected from a top neighbor block of said current block.

8. The method of claim 5, wherein said estimating said predicted motion vector (PMV') comprises selecting a median of a plurality of motion vectors selected from a plurality of neighbor blocks of said current block.

9. The method of claim 5, wherein said current block has a partition type comprising at least one of: a 16×16 partition, a 16×8 partition, a 8×16 partition, or a 8×8 partition.

10. The method of claim 1, wherein said at least one previously coded picture comprises N previously coded pictures that are M picture away from a current picture of said current block.

11. A non-transitory computer-readable medium having stored thereon a plurality of instructions, the plurality of instructions including instructions which, when executed by at least one processor of a motion estimation module, cause the processor to perform the steps of a method for performing motion estimation, comprising:
    selecting a motion vector centering for a current block in a search area of at least one reference picture, wherein said selecting a motion vector centering comprises collocating a center of said search area at a distance displaced from a top left position of said current block, where said distance is derived from a Search Area Center Vector (SACV);
    calculating a matching cost for each of a plurality of candidate motion vectors derived from said search area, wherein said calculating said matching cost comprises estimating a Lagrangian multiplier, and further, wherein said Lagrangian multiplier is estimated using quantization parameter information from a plurality of macroblocks of at least one previously coded picture; and
    outputting at least one of said plurality of candidate motion vectors based on said matching cost associated with each of said plurality of candidate motion vectors to a main coding loop of an encoder;
    wherein the at least one processor of the motion estimation module performs the selecting, the calculating, and the outputting independently of motion vectors calculated by the main coding loop, and without receiving motion vector information from the main coding loop.

12. The non-transitory computer-readable medium of claim 11, wherein said selecting a motion vector centering comprises collocating a center of said search area with a top left position of said current block.

13. The non-transitory computer-readable medium of claim 11, wherein said SACV is a vector that is computed as a median of motion vectors from a plurality of neighboring blocks of said current block.

14. The non-transitory computer-readable medium of claim 11, wherein said current block is a current block pair having a top block and a bottom block, and wherein said SACV is a vector that is computed from a common vector that refers to a motion vector from a neighboring block of said top block of said current block pair.

15. The non-transitory computer-readable medium of claim 11, wherein said calculating said matching cost comprises estimating a predicted motion vector (PMV').

16. The non-transitory computer-readable medium of claim 15, wherein said estimating said predicted motion vector (PMV') comprises at least one of: using a motion vector selected from a left neighbor block of said current block, using a motion vector selected from a top neighbor block of said current block, or selecting a median of a plurality of motion vectors selected from a plurality of neighbor blocks of said current block.

17. An encoding system, comprising:
an encoder having a main coding loop; and
a motion estimation module, communicatively coupled to said encoder,
wherein said motion estimation module is configured to select a motion vector centering for a current block in a search area of at least one reference picture, wherein said selecting the motion vector centering comprises collocating a center of said search area at a distance displaced from a top left position of said current block, where said distance is derived from a Search Area Center Vector (SACV); and
wherein said motion estimation module is configured to calculate a matching cost for each of a plurality of candidate motion vectors derived from said search area, and
wherein said motion estimation module is configured to output at least one of said plurality of candidate motion vectors based on said matching cost associated with each of said plurality of candidate motion vectors to a main coding loop, wherein said calculating said matching cost comprises estimating a Lagrangian multiplier, and further, wherein said Lagrangian multiplier is estimated using quantization parameter information from a plurality of macroblocks of at least one previously coded picture; and
wherein said motion estimation module is configured to perform said selecting, said calculating, and said outputting independently of motion vectors calculated by the main coding loop, and without receiving motion vector information from the main coding loop.

18. The encoding system of claim 17, wherein said selecting said motion vector centering comprises collocating a center of said search area with a top left position of said current block.

19. The encoding system of claim 17, wherein said SACV is a vector that is computed as a median of motion vectors from a plurality of neighboring blocks of said current block.

20. The encoding system of claim 17, wherein said current block is a current block pair having a top block and a bottom block, and wherein said SACV is a vector that is computed from a common vector that refers to a motion vector from a neighboring block of said top block of said current block pair.

21. The encoding system of claim 17, wherein said calculating said matching cost comprises estimating a predicted motion vector (PMV').

22. The encoding system of claim 21, wherein said estimating said predicted motion vector (PMV') comprises using a motion vector selected from a left neighbor block of said current block.

23. The encoding system of claim 21, wherein said estimating said predicted motion vector (PMV') comprises using a motion vector selected from a top neighbor block of said current block.

24. The encoding system of claim 21, wherein said estimating said predicted motion vector (PMV') comprises selecting a median of a plurality of motion vectors selected from a plurality of neighbor blocks of said current block.

25. The encoding system of claim 21, wherein said current block has a partition type comprising at least one of: a 16×16 partition, a 16×8 partition, a 8×16 partition, or a 8×8 partition.

* * * * *